United States Patent Office 3,028,359
Patented Apr. 3, 1962

3,028,359
ETHOXYLINE GRAFT COPOLYMERS CONTAINING THE NORBORNENE NUCLEUS AND COATING COMPOSITIONS MADE THEREFROM
Norman G. Gaylord, Westbury, N.Y., assignor to Interchemical Corporation, New York, N.Y., a corporation of Ohio
No Drawing. Filed Apr. 27, 1959, Ser. No. 808,887
20 Claims. (Cl. 260—45.2)

This invention relates to novel and useful polymeric materials made by addition polymerization and to coating compositions containing these new polymeric materials. More particularly it relates to new graft copolymers in which ethoxyline resins have been incorporated in acrylic polymers by graft polymerization. These new graft copolymers are highly compatible with urea-aldehyde and triazine-aldehyde resins and reactive therewith under heat curing conditions to yield extremely durable surface coatings, which have an excellent resistance to weathering, solvents, salt spray, soaps and detergents.

The new graft copolymers of this invention are prepared by addition polymerization by the conventional free radical method in an organic solvent solution of 3

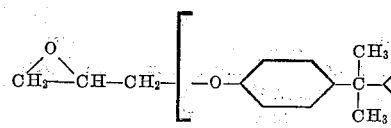

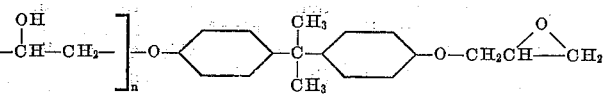

to 27 parts by weight of a non-allylic alcohol containing the norbornene nucleus, 30 to 82 parts by weight of at least one acrylic type ester having the formula $$CH_2=C-C-O-R'$$
$$\phantom{CH_2=}\begin{array}{cc}R & O\\ | & \|\end{array}$$

where R is a member selected from the group consisting of hydrogen, methyl and ethyl and R' is an alkyl radical containing from 1 to 8 carbons and up to 32 parts by weight of ethylenically unsaturated monomers, said addition polymerization reaction being conducted in the presence of an diepoxide resin.

In preparing my novel graft copolymers I prefer to use "Epon" ethoxyline resins, "Epon 828" and "Epon 1001." The term Epon is a registered trademark used to designate a class of ethoxyline resins formed by the reaction of bisphenol A and epichlorohydrin. By referring to "Epon 828" and "Epon 1001" resins in the specification, I do not intend to limit the practice of my invention to only these two resins. I merely wish to refer to these Epon resins as a convenient commercial source of the ethoxyline resins required in the practice of my invention. It will be obvious to those skilled in the art upon reading the following description and structural formulas of the required ethoxyline resins that there exist other commercial resins having the preferred structure and properties. Ethoxyline resins having my desired properties include other commercial resins found in "ERL," "Araldite," "DER," "Epi-Rez" and "Epotuf" series as well as higher members of the Epon series such as Epon 1004, 1007 and 1009.

The ethoxyline resins used in this invention are conventionally prepared by reacting a polyhydric phenol, particularly bisphenol A with epichlorohydrin. By regulating the proportions of these two reactants, the molecular size and the molecular structure of the ethoxyline resins produced may be controlled. By using an excess of epichlorohydrin, a low molecular weight ethoxyline resin is produced which has substantially the following structure:

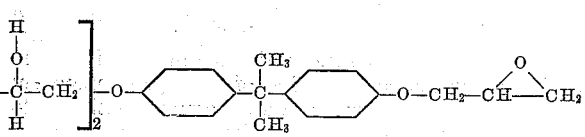

An ethoxyline resin having the above structure sold under the trademark "Epon 828," is one of the preferred resins in the practice of this invention. Epon 828 has an average molecular weight of 350, an epoxide equivalent weight of 175–210 and an average of almost 2 epoxides per molecule.

By increasing the amount of bisphenol A used, the higher molecular weight resin, sold under the trademark "Epon 1001" may be produced. This ethoxyline resin has an average molecular weight of 875, an epoxide equivalent weight of 450–525 and an average of 1.7 to 1.9 epoxides per molecule. It has substantially the following molecular structure:

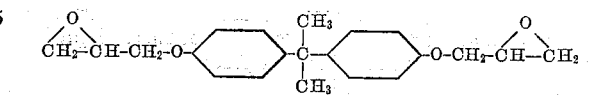

Thus, the ethoxyline resins utilizable in this invention may be defined structurally as follows:

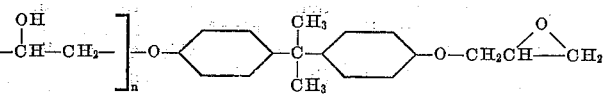

where n is an integer from 0 to 2.

While the above structural formulas show Epon 828 and Epon 1001 to consist of diepoxide molecules, it should be remembered that neither the Epon resins or other commercially available resins consist entirely of molecules of a single type. Consequently neither Epon 828 nor Epon 1001 is entirely a diepoxide resin. Side reactions in the preparation of these resins—such as termination of the chain with a bisphenol molecule instead of epichlorohydrin, or conversion of epoxide to glycol—reduce the epoxide content. However, for the sake of convenience in description, the preferred resins of this invention are referred to and shown as substantially diepoxide resins.

With respect to the non-allylic alcohols containing the norbornene nucleus it should be noted that norbornene has the formula:

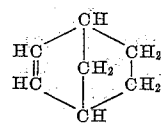

While for the purposes of describing the present invention, I will refer mostly to copolymers of 2-hydroxymethyl-5-norbornene which has the following structure

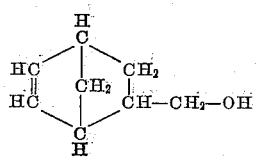

it will be understood that related homologs can readily be used and it is intended that the appended claims will cover the use of such compounds.

2-hydroxymethyl-5-norbornene is readily prepared by condensing allyl alcohol with cyclopentadiene (U.S. Patent No. 2,596,279 and No. 2,353,606). Alkyl substituted cyclopentadienes behave similarly to yield corresponding substituted derivatives. Likewise compounds containing two alcoholic hydroxyl groups can be obtained by condensing an unsaturated diol, such as butenediol with cyclopentadiene.

The addition polymerization is initiated by conventional polymerization initiators of the free radical type in solution. The most commonly used initiators are azo compounds and organic peroxygen compounds. I prefer to use benzoyl peroxide. While I prefer to use xylene as my solvent, other conventional solvents such as benzene, ethyl benzene or toluene may be used. I have found that in the case of the higher molecular weight "Epon 1001," there is a slight tendency for some of the Epon resin to separate out from the graft copolymer and cause a slight cloudiness in the solution. However, I have also found that by employing relatively small quantities of butanol as an auxiliary solvent together with my standard xylene solvent during the polymerization reaction, this slight tendency toward separation on the part of the "Epon 1001" resin is overcome.

I have discovered that the unusually excellent solvent, salt spray, soap and detergent resistance of my cured surface coatings containing a blend of these graft copolymer and urea-aldehyde or triazine-aldehyde resins is to a considerable extent due to the presence of the Epon resin in the graft copolymer. I have, further found that detergent, solvent and salt spray resistance may be increased by increasing the concentration of the Epon component in the graft copolymer. It was, therefore, desirable to incorporate as great a concentration as possible of Epon resin.

In general, the miscibility of Epon resins and acrylic polymers is very poor and hence their compatibility with each other in conventional cold blending procedures is very limited. For example, let us consider the acrylic copolymer into which the Epon resin has been incorporated by grafting. This acrylic copolymer which is disclosed and claimed in copending application, Serial Number 768,839, filed October 22, 1958 (Patent No. 2,985,611), is the reaction product of non-allylic alcohol containing the norbornene nucleus, at least one alkyl ester of acrylic or methacrylic acid and an optional amount of certain modifiers which include methacrylic acid and vinyl toluene. This ungrafted acrylic copolymer displays relatively poor compatibility with Epon resins. When this acrylic copolymer is blended with an Epon resin such as "Epon 1001" by conventional cold blending techniques, concentrations of Epon greater than 5% weight were incompatible with the copolymer. On the other hand, the graft copolymer of this invention incorporates as high as 37.5% by weight of Epon resins. It has been further found that the cold blending of the ungrafted copolymers and Epon resins results in a blend which displays incompatibilities with urea-aldehyde and triazine-aldehyde resins and accordingly can not be effectively combined with such resins in heat cured surface coatings. On the other hand, the graft copolymer of this invention does not display such incompatibility and may be readily blended with urea-aldehyde and triazine-aldehyde resins to provide an extremely durable surface coating which has an excellent resistance to weathering, solvents, salt spray, soaps and detergents.

In addition, I have discovered that even where the concentration of the Epon resin blended with the ungrafted acrylic copolymer by cold blending is equal to the Epon concentration incorporated in the grafted copolymer of this invention, the grafted copolymer when blended with a triazine-aldehyde resin displayed considerably improved detergent, salt spray and solvent resistance over the cold blend compositions.

The term "graft copolymers" as used in this specification should be defined and distinguished from ordinary copolymers. The term "copolymers" as used in this specification covers the reaction product obtained by the addition polymerization of a mixture of two or more ethylenically unsaturated monomeric compounds. The resultant copolymers contain the polymerized monomeric groupings of the monomers present distributed within the molecule in a regular or random manner. In contrast, "graft copolymers" covers polymeric products obtained by addition polymerization of a mixture of two or more monomers in the presence of a preformed resin, or polymer, in such manner that the monomeric units copolymerize to form attached, or grafted, side chains, or branches on the preformed polymer. The important structural characteristic of graft copolymers is that the composition of monomers constituting the backbone may be different from those constituting the branches.

In the present invention, chains comprising the copolymer formed by the addition polymerization of a non-allylic alcohol containing the norbornene nucleus, one or more acrylic esters having the formula

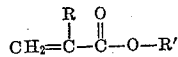

where R is a member selected from the group consisting of hydrogen, methyl and ethyl and R' is an alkyl radical containing from 1 to 8 carbons and an optional additional monomer have been grafted upon a backbone comprising an Epon resin.

Without absolute commitment on the theory involved, it is believed that by means of a chain transfer mechanism, centers are activated along the main Epon resin backbone. This results in the relocation of the free radical source at these centers and the consequent generation of branch copolymers by the polymerization of the monomers capable of being polymerized by a free radical mechanism from these centers.

The novel graft copolymers when blended with a triazine-formaldehyde resin provide surface coatings having excellent detergent, soap, solvent and salt spray resistance when they are combined with organic solvents by conventional methods. These graft copolymers also show excellent pigment-wetting power which facilitates the dispersion of pigments such as carbon black, titanium oxide, phthalocyanines, etc., in vehicles containing these copolymers.

The following examples will further illustrate the practice of this invention:

*Example 1*

|  | Grams |
|---|---|
| (A) 2-hydroxymethyl-5-norbornene | 54 |
| (B) Epon 828 | 30 |
| (C) Xylene | 150 |
| (D) Butyl acrylate | 220 |
| (E) Methyl methacrylate | 13 |
| (F) Methacrylic acid | 13 |
| (G) Xylene | 150 |
| (H) Benzoyl peroxide | 6 |
| (I) Benzoyl peroxide | 1.5 |

A solution of (D), (E), (F), (G), and (H) is added dropwise over a period of 1½ hours to a solution of (A), (B), and (C) maintained at 90° C. under a nitrogen atmosphere. The mixture is then maintained at 90° C. for an additional 1½ hours, at which time (I) is added and the resulting mixture continues to be maintained at 90° C. for another 1½ hours making a total of 4½ hours at 90° C. The mixture is then heated to and maintained at 125° C. for 1 hour. The mixture is continuously stirred during the entire reaction. A solids determination by heating a sample to 177° C. for 1 hour to remove volatile components indicates a 90.5% conversion of monomers to copolymer. The viscosity is between D and E on the Gardner-Holt scale.

The resin is compatible with amine-formaldehyde resins. When the copolymer is blended in solution with a butylated triazine formaldehyde resin (Uformite MX-61) in a weight ratio of six parts of the grafted copolymer resin to four parts of triazine resin, and the blend is drawn down on steel panel and baked at 177° C. for 30 minutes, the resulting films are hard, flexible, well cured, exhibit a high gloss and show an excellent resistance to soaps, solvents, and detergents.

*Example 2*

|  | Grams |
|---|---|
| (A) 2-hydroxymethyl-5-norbornene | 45 |
| (B) Epon 828 | 45 |
| (C) Xylene | 150 |
| (D) Butyl acrylate | 180 |
| (E) Methyl methacrylate | 15 |
| (F) Methacrylic acid | 15 |
| (G) Xylene | 150 |
| (H) Benzoyl peroxide | 6 |
| (I) Benzoyl peroxide | 1.5 |

A solution of (D), (E), (F), (G) and (H) is added dropwise over a period of 1½ hours to a solution of (A), (B) and (C) maintained at 90° C. under a nitrogen atmosphere. The mixture is then maintained at 90° C. for an additional 1½ hours, at which time (I) is added and the resulting mixture continues to be maintained at 90° C. for another 1½ hours, making a total of 4½ hours at 90° C. The mixture is then heated to and maintained at 125° C. for 1 hour. The mixture is continuously stirred during the entire reaction. A solids determination by heating a sample to 177° C. for 1 hour to remove volatile components indicates a 93.2% conversion of monomers to copolymer.

The resin is compatible with amine-formaldehyde resins. When the copolymer is blended in solution with a butylated triazine formaldehyde resin (Uformite MX-61) in a weight ratio of six parts of the grafted copolymer resin to four parts of triazine resin, and the blend is drawn down on a steel panel and baked at 177° C. for 30 minutes, the resulting film is hard, flexible, exhibits a high gloss and displays excellent resistance to the action of soaps, solvents, and detergents.

*Example 3*

|  | Grams |
|---|---|
| (A) 2-hydroxymethyl-5-norbornene | 270 |
| (B) Epon 828 | 450 |
| (C) Xylene | 750 |
| (D) Butyl acrylate | 1100 |
| (E) Methyl methacrylate | 65 |
| (F) Methacrylic acid | 65 |
| (G) Xylene | 750 |
| (H) Benzoyl peroxide | 30 |
| (I) benzoyl peroxide | 7.5 |

A solution of (D), (E), (F), (G), and (H) is added dropwise over a period of 1½ hours to a solution of (A), (B), and (C) maintained at 90° C. under a nitrogen atmosphere. The mixture is then maintained at 90° for an additional 1½ hours, at which time, (I) is added and the resulting mixture continues to be maintained at 90° C. for 1½ hours. The mixture is then heated to and maintained at 125° C. for 1 hour. The mixture is continuously stirred during the entire reaction. A solids determination by heating a sample to 177° C. for 1 hour to remove volatile components indicates a 90.4% conversion of monomer to copolymer. The viscosity is F on the Gardner-Holt scale.

The resin is compatible with amine formaldehyde resins. When the copolymer is blended in solution with a butylated triazine-formaldehyde resin (Uformite MX-61) in a weight ratio of six parts of the grafted copolymer resin to four parts of triazine resin, and the blend is drawn down on a steel panel and baked at 177° C. for 30 minutes, the resulting film is hard, flexible, well cured, has a high gloss and shows an excellent resistance to soaps, solvents, and detergents.

*Example 4*

|  | Grams |
|---|---|
| (A) 2-hydroxymethyl-5-norbornene | 54 |
| (B) Epon 828 | 90 |
| (C) Xylene | 150 |
| (D) Butyl acrylate | 220 |
| (E) Methyl methacrylate | 13 |
| (F) Methacrylic acid | 13 |
| (G) Xylene | 150 |
| (H) Benzoyl peroxide | 6 |
| (I) Benzoyl peroxide | 1.5 |

A solution of (D), (E), (F), (G), and (H) is added dropwise over a period of 1½ hours to a solution of (A), (B), and (C) maintained at 90° C. under a nitrogen atmosphere. The mixture is then maintained at 90° C. for an additional 1½ hours, at which time (I) is added and the resulting mixture continues to be maintained at 90° C. for another 1½ hours, making a total of 4½ hours at 90° C. The mixture is then heated to and maintained at 125° C. for 1 hour. The mixture is continuously stirred during the entire reaction. A solids determination by heating a sample to 177° C. for 1 hour to remove volatile components indicates a 93.8% conversion of monomers to copolymer.

The resin is compatible with amine-formaldehyde resins and may be cured to produce films characterized by an unusual resistance to soaps, solvents, and detergents.

*Example 5*

|  | Grams |
|---|---|
| (A) 2-hydroxymethyl-5-norbornene | 54 |
| (B) Epon 828 | 90 |
| (C) Xylene | 150 |
| (D) Butyl acrylate | 220 |
| (E) Methyl methacrylate | 26 |
| (F) Xylene | 150 |
| (G) Benzoyl peroxide | 6 |
| (H) Benzoyl peroxide | 1.5 |

A solution of (D), (E), (F) and (G) is added dropwise over a period of 1½ hours to a solution of (A), (B) and (C) maintained at 90° C. under a nitrogen atmosphere. The mixture is then maintained at 90° C. for an additional 1½ hours, at which time (I) is added and the resulting mixture continues to be maintained at 90° C. for another 1½ hours, making a total of 4½ hours at 90° C. The mixture is then heated to and maintained at 125° C. for 1 hour. The mixture is continuously stirred during the entire reaction. A solids determination by heating a sample to 177° C. for 1 hour to remove volatile components indicates a 90.5% conversion of monomers to copolymer.

A solution of the resulting grafted copolymer resin in a volatile organic solvent provides a surface coating which is highly resistant to the action of soaps, solvents and detergents.

*Example 6*

|  | Grams |
|---|---|
| (A) 2-hydroxymethyl-5-norbornene | 45 |
| (B) Epon 828 | 90 |
| (C) Xylene | 150 |
| (D) Vinyl toluene | 90 |
| (E) Methyl methacrylate | 30 |
| (F) Methacrylic acid | 15 |
| (G) Xylene | 150 |
| (H) Benzoyl peroxide | 6 |
| (I) Benzoyl peroxide | 1.5 |
| (J) Ethyl hexyl acrylate | 120 |

A solution of (D), (E), (F), (G), (H) and (J) is added dropwise over a period of 1½ hours to a solution of (A), (B) and (C) maintained at 90° C. under a nitrogen atmosphere. The mixture is then maintained at 90° for an additional 1½ hours, at which time (I) is added and the resulting mixture continues to be maintained at 90° C. for another 1½ hours making a total of 4½ hours at 90° C. The mixture is then heated to and maintained at 125° C. for 1 hour. The mixture is continuously stirred during the entire reaction. A solids determination by heating a sample to 177° C. for 1 hour to remove volatile components indicates a 85.2% conversion of monomers to copolymer. The viscosity is E on the Gardner-Holt scale.

The resin is compatible with amine-formaldehyde resins. When the copolymer is blended in solution with a butylated triazine formaldehyde resin (Uformite MX-61) in a weight ratio of six parts of the grafted copolymer resin to four parts of triazine resin, and the blend is drawn down on a steel panel and baked at 177° C. for 30 minutes, the resulting film is slightly brittle, but is hard, has a high gloss and shows good resistance to soaps, solvents, and detergents.

*Example 7*

| | Grams |
|---|---|
| (A) 2-hydroxymethyl-5-norbornene | 270 |
| (B) Epon 1001 | 450 |
| (C) Xylene | 750 |
| (D) Butyl acrylate | 1100 |
| (E) Methyl methacrylate | 65 |
| (F) Methacrylic acid | 65 |
| (G) Xylene | 750 |
| (H) Benzoyl peroxide | 30 |
| (I) Benzoyl peroxide | 7.5 |

A solution of (D), (E), (F), (G) and (H) is added dropwise over a period of 1½ hours to a solution of (A), (B) and (C) maintained at 90° C. under a nitrogen atmosphere. The mixture is then maintained at 90° for an additional 1½ hours, at which time (I) is added and the resulting mixture continues to be maintained at 90° C. for another 1½ hours, making a total of 4½ hours at 90° C. The mixture is then heated to and maintained at 125° C. for 1 hour. The mixture is continuously stirred during the entire reaction. A solids determination by heating a sample to 177° C. for 1 hour to remove volatile components indicates a 91.2% conversion of monomers to copolymer. The viscosity is M on the Gardner-Holt scale.

The resin is compatible with amine-formaldehyde resins. When the copolymer is blended in solution with a butylated triazine-formaldehyde resin (Uformite MX-61) in a weight ratio of six parts of the grafted copolymer resin to four parts of triazine resin, and the blend is drawn down on a steel panel and baked at 177° C. for 30 minutes, the resulting films are hard, flexible, well cured, exhibit a high gloss and show an excellent resistance to soaps, solvents and detergents.

*Example 8*

| | Grams |
|---|---|
| (A) 2-hydroxymethyl-5-norbornene | 54 |
| (B) Epon 1001 | 30 |
| (C) Xylene | 150 |
| (D) Butyl acrylate | 220 |
| (E) Methyl methacrylate | 13 |
| (F) Methacrylic acid | 13 |
| (G) Xylene | 150 |
| (H) Benzoyl peroxide | 6 |
| (I) Benzoyl peroxide | 1.5 |

A solution of (D), (E), (F), (G) and (H) is added dropwise over a period of 1½ hours to a solution of (A), (B) and (C) maintained at 90° C. under a nitrogen atmosphere. The mixture is then maintained at 90° C. for an additional 1½ hours, at which time, (I) is added and the resulting mixture continues to be maintained at 90° C. for another 1½ hours, making a total of 4½ hours at 90° C. The mixture is then heated to and maintained at 125° C. for 1 hour. The mixture is continuously stirred during the entire reaction. A solids determination by heating a sample to 177° C. for 1 hour to remove volatile components indicates a 90% conversion of monomers to copolymer. The viscosity is H on the Gardner-Holt scale.

The resin is compatible with the amine-formaldehyde resins. When the copolymer is blended in solution with a butylated triazine-formaldehyde resin (Uformite MX-61) in a weight ratio of six parts of the grafted copolymer resin to four parts of triazine resin, and the blend is drawn down on a steel panel and baked at 177° C. for 30 minutes, the resulting films are hard, flexible, well cured, exhibit a high gloss and show an excellent resistance to soaps, solvents, and detergents.

*Example 9*

| | Grams |
|---|---|
| (A) 2-hydroxymethyl-5-norbornene | 54 |
| (B) Epon 1001 | 180 |
| (C) Xylene | 150 |
| (D) Butyl acrylate | 220 |
| (E) Methyl methacrylate | 13 |
| (F) Methacrylic acid | 13 |
| (G) Xylene | 150 |
| (H) Benzoyl peroxide | 6 |
| (I) Benzoyl peroxide | 1.5 |

A solution of (D), (E), (F), (G) and (H) is added dropwise over a period of 1½ hours to a solution of (A), (B) and (C) maintained at 90° C. under a nitrogen atmosphere. The mixture is then maintained at 90° for an additional 1½ hours, at which time, (I) is added and the resulting mixture continues to be maintained at 90° C. for another 1½ hours, making a total of 4½ hours at 90° C. The mixture is then heated to and maintained at 125° C. for 1 hour. The mixture is continuously stirred during the entire reaction. A solids determination by heating a sample to 177° C. for 1 hour to remove volatile components indicates a 89.8% conversion of monomers to copolymer.

The resin is compatible with amine-formaldehyde resins. When the copolymer is blended in solution with a butylated triazine formaldehyde resin (Uformite MX-61) in a weight ratio of six parts of the grafted copolymer resin to four parts of triazine resin, and the blend is drawn down on a steel panel and baked at 177° C. for 30 minutes, the resulting film is characterized by an excellent resistance to soaps, solvents, and detergents.

*Example 10*

| | Grams |
|---|---|
| (A) 2-hydroxymethyl-5-norbornene | 270 |
| (B) Epon 1001 | 450 |
| (C) Xylene | 750 |
| (D) Butyl acrylate | 1100 |
| (E) Methyl methacrylate | 65 |
| (F) Methacrylic acid | 65 |
| (G) Xylene | 750 |
| (H) Benzoyl peroxide | 30 |
| (I) Benzoyl peroxide | 7.5 |
| (J) Butanol | 151 |

A solution of (D), (E), (F), (G) and (H) is added dropwise over a period of 2½ hours to a solution of (A), (B) and (C) maintained at 90° C. under a nitrogen atmosphere. The mixture is then maintained at 90° for an additional ½ hour, at which time (I) is added and the resulting mixture continues to be maintained at 90° C. for another 1½ hours, making a total of 4½ hours at 90° C. (J) is then added and the mixture is then heated to and maintained at 125° C. for 1 hour. The mixture is continuously stirred during the entire reaction. A solids determination by heating a sample to 177° C. for 1 hour to remove volatile components indicates a 93.8% conversion of monomers to copolymer.

The resin is compatible with amine-formaldehyde resin. When the copolymer is blended in solution with a butylated triazine formaldehyde resin (Uformite MX-61), the result is a heat curable surface coating characterized by its excellent resistance to solvents, soaps and detergents.

Example 11

| | Grams |
|---|---|
| (A) 2-hydroxymethyl-5-norborene | 270 |
| (B) Epon 1001 | 450 |
| (C) Xylene | 650 |
| (D) Butyl acrylate | 1100 |
| (E) Methyl methacrylate | 65 |
| (F) Methacrylic acid | 65 |
| (G) Xylene | 650 |
| (H) Benzoyl peroxide | 30 |
| (I) Benzoyl peroxide | 7.5 |
| (J) Butanol | 136.5 |

$$CH_2{-}\overset{O}{\overset{\diagup\diagdown}{}}CH{-}CH_2{-}\left[{-}O{-}\langle\bigcirc\rangle{-}\underset{CH_3}{\overset{CH_3}{\overset{|}{C}}}{-}\langle\bigcirc\rangle{-}O{-}CH_2{-}\overset{OH}{\overset{|}{C}}H{-}CH_2{-}\right]_n{-}O{-}\langle\bigcirc\rangle{-}\underset{CH_3}{\overset{CH_3}{\overset{|}{C}}}{-}\langle\bigcirc\rangle{-}O{-}CH_2{-}CH\overset{O}{\overset{\diagup\diagdown}{}}CH_2$$

A solution of (D), (E), (F), (G), (H) and (J) is added dropwise over a period of 2½ hours to a solution of (A), (B) and (C) maintained at 90° C. under a nitrogen atmosphere. The mixture is then maintained at 90° for an additional ½ hour, at which time (I) is added and the resulting mixture continues to be maintained at 90° C. for another 2½ hours, making a total of 5½ hours at 90° C. The mixture is continuously stirred during the entire reaction. A solids determination by heating a sample to 177° C. for 1 hour to remove volatile components indicates a 94.3% conversion of monomers to copolymer. The viscosity is M on the Gardner-Holt scale.

The resin is compatible with amine-formaldehyde resins. When the copolymer is blended in solution with a butylated triazine formaldehyde resin (Uformite MX-61), the result is a heat curable surface coating characterized by its excellent resistance to solvent, soaps, and detergents.

While there have been described what are at present considered to be the preferred embodiments of this invention, it will be obvious to those skilled in the art that various changes and modifications may be made therein without departing from the invention, and it is therefore, aimed to cover all such changes and modifications as fall within the true spirit and scope of the invention.

What is claimed is:

1. A graft copolymer comprising the addition polymerization products of (a) 3% to 27% by weight of a non-allylic alcohol containing the norbornene nucleus, (b) 38% to 82% by weight of acrylic ester material having the formula $$CH_2{=}\underset{R}{\overset{|}{C}}{-}\overset{O}{\overset{\|}{C}}{-}O{-}R'$$

where R is a member selected from the group consisting of hydrogen, methyl and ethyl and R' is an alkyl radical containing from 1 to 8 carbons, (c) from 0% to 32% by weight of at least one monomer selected from the group consisting of methacrylic acid and vinyl toluene and (d) 9% to 37% by weight of an ethoxyline resin having the formula $$CH_2{-}\overset{O}{\overset{\diagup\diagdown}{}}CH{-}CH_2{-}\left[{-}O{-}\langle\bigcirc\rangle{-}\underset{CH_3}{\overset{CH_3}{\overset{|}{C}}}{-}\langle\bigcirc\rangle{-}O{-}CH_2{-}\overset{OH}{\overset{|}{C}}H{-}CH_2{-}\right]_n{-}O{-}\langle\bigcirc\rangle{-}\underset{CH_3}{\overset{CH_3}{\overset{|}{C}}}{-}\langle\bigcirc\rangle{-}O{-}CH_2CH\overset{O}{\overset{\diagup\diagdown}{}}CH_2$$

where $n$ is an integer from 0 to 2.

2. A graft copolymer of claim 1, wherein the non-allylic alcohol containing the norbornene nucleus is 2-hydroxy-methyl-5-norbornene.

3. A graft copolymer of claim 1, being the addition polymerization product of a mixture comprising 2-hydroxy-methyl-5-norbornene, butyl acrylate, methyl methacrylate, methacrylic acid and a diepoxy resin having the formula $$CH_2{-}\overset{O}{\overset{\diagup\diagdown}{}}CH{-}CH_2{-}O{-}\langle\bigcirc\rangle{-}\underset{CH_3}{\overset{CH_3}{\overset{|}{C}}}{-}\langle\bigcirc\rangle{-}O{-}CH_2{-}CH\overset{O}{\overset{\diagup\diagdown}{}}CH_2$$

4. A graft copolymer of claim 1, being the addition polymerization product of a mixture comprising 2-hydroxymethyl-5-norbornene, butyl acrylate, methyl methacrylate, methacrylic acid and an ethoxyline resin having the formula $$CH_2{-}\overset{O}{\overset{\diagup\diagdown}{}}CH{-}CH_2{-}\left[{-}O{-}\langle\bigcirc\rangle{-}\underset{CH_3}{\overset{CH_3}{\overset{|}{C}}}{-}\langle\bigcirc\rangle{-}O{-}CH_2{-}\overset{OH}{\overset{|}{C}}H{-}CH_2{-}\right]_n{-}O{-}\langle\bigcirc\rangle{-}\underset{CH_3}{\overset{CH_3}{\overset{|}{C}}}{-}\langle\bigcirc\rangle{-}O{-}CH_2{-}CH\overset{O}{\overset{\diagup\diagdown}{}}CH_2$$

5. A graft copolymer of claim 1, being the addition polymerization product of a mixture comprising 2-hydroxymethyl-5-norbornene, ethyl hexyl acrylate, methyl methacrylate, methacrylic acid, vinyl toluene and a diepoxy resin having the formula $$CH_2{-}\overset{O}{\overset{\diagup\diagdown}{}}CH{-}CH_2{-}O{-}\langle\bigcirc\rangle{-}\underset{CH_3}{\overset{CH_3}{\overset{|}{C}}}{-}\langle\bigcirc\rangle{-}O{-}CH_2{-}CH\overset{O}{\overset{\diagup\diagdown}{}}CH_2$$

6. A graft copolymer of claim 1, being the addition polymerization product of a mixture comprising 2-hydroxymethyl-5-norbornene, butyl acrylate, methyl methacrylate and a diepoxy resin having the formula $$CH_2{-}\overset{O}{\overset{\diagup\diagdown}{}}CH{-}CH_2{-}O{-}\langle\bigcirc\rangle{-}\underset{CH_3}{\overset{CH_3}{\overset{|}{C}}}{-}\langle\bigcirc\rangle{-}O{-}CH_2{-}CH\overset{O}{\overset{\diagup\diagdown}{}}CH_2$$

7. A surface coating composition comprising a solution in a volatile organic solvent of a graft copolymer of claim 1.

8. A surface coating composition comprising a solution in a volatile organic solvent of a graft copolymer of claim 6.

9. A surface coating composition comprising a pigment dispersed in a solution in a volatile organic solvent of a graft copolymer of claim 1.

10. A surface coating composition comprising a pigment dispersed in a solution in a volatile organic solvent of a graft copolymer of claim 6.

11. A heat curable surface coating composition comprising a solution in a volatile organic solvent of a graft copolymer of claim 1 and an organic solvent soluble thermosetting aminoplast resin selected from the group consisting of urea-aldehyde resins and triazine-aldehyde resins.

12. A heat curable surface coating composition comprising a solution in a volatile organic solvent of a graft copolymer of claim 2 and an organic solvent soluble thermosetting aminoplast resin selected from the group consisting of urea-aldehyde resins and triazine-aldehyde resins.

13. A heat curable surface coating composition comprising a solution in a volatile organic solvent of a graft copolymer of claim 3 and an organic solvent soluble thermosetting aminoplast resin selected from the group consisting of urea-aldehyde resins and triazine-aldehyde resins.

14. A heat curable surface coating composition comprising a solution in a volatile organic solvent of a graft copolymer of claim 4 and an organic solvent soluble thermosetting aminoplast resin selected from the group consisting of urea-aldehyde resins and triazine-aldehyde resins.

15. A heat curable surface coating composition comprising a solution in a volatile organic solvent of a graft copolymer of claim 5 and an organic solvent soluble thermosetting aminoplast resin selected from the group consisting of urea-aldehyde resins and triazine-aldehyde resins.

16. A heat curable surface coating composition comprising a pigment dispersed in a solution in a volatile organic solvent of a graft copolymer of claim 1 and an organic solvent soluble thermosetting aminoplast resin selected from the group consisting of urea-aldehyde resins and triazine-aldehyde resins.

17. A heat curable surface coating composition comprising a pigment dispersed in a solution in a volatile organic solvent of a graft copolymer of claim 2 and an organic solvent soluble thermosetting aminoplast resin selected from the group consisting of urea-aldehyde resins and triazine-aldehyde resins.

18. A heat curable surface coating composition comprising a pigment dispersed in a solution in a volatile organic solvent of a graft copolymer of claim 3 and an organic solvent soluble thermosetting aminoplast resin selected from the group consisting of urea-aldehyde resins and triazine-aldehyde resins.

19. A heat curable surface coating composition comprising a pigment dispersed in a solution in a volatile organic solvent of a graft copolymer of claim 4 and an organic solvent soluble thermosetting aminoplast resin selected from the group consisting of urea-aldehyde resins and triazine-aldehyde resins.

20. A heat curable surface coating composition comprising a pigment dispersed in a solution in a volatile organic solvent of a graft copolymer of claim 5 and an organic solvent soluble thermosetting aminoplast resin selected from the group consisting of urea-aldehyde resins and triazine-aldehyde resins.

References Cited in the file of this patent

UNITED STATES PATENTS

| | | |
|---|---|---|
| 2,596,279 | Nichols et al. | May 13, 1952 |
| 2,853,462 | Gaylord | Sept. 23, 1958 |
| 2,890,202 | Parker | June 9, 1959 |